United States Patent
Zhang et al.

(10) Patent No.: US 12,360,240 B2
(45) Date of Patent: Jul. 15, 2025

(54) STATIONARY OBJECT DETECTION AND CLASSIFICATION BASED ON LOW-LEVEL RADAR DATA

(71) Applicant: Aptiv Technologies AG, Schaffhausen (CH)

(72) Inventors: Shan Zhang, Yorba Linda, CA (US); Kanishka Tyagi, Agoura Hills, CA (US); Steven Shaw, Indianapolis, IN (US); Narbik Manukian, Los Angeles, CA (US)

(73) Assignee: Aptiv Technologies AG, Schaffhausen (CH)

( * ) Notice: Subject to any disclaimer, the term of this patent is extended or adjusted under 35 U.S.C. 154(b) by 390 days.

(21) Appl. No.: 17/938,876

(22) Filed: Oct. 7, 2022

(65) Prior Publication Data

US 2024/0134038 A1   Apr. 25, 2024

(51) Int. Cl.
   *G01S 13/931*   (2020.01)
   *B60W 30/095*   (2012.01)
   (Continued)

(52) U.S. Cl.
   CPC ....... *G01S 13/931* (2013.01); *B60W 30/0956* (2013.01); *G01S 13/89* (2013.01);
   (Continued)

(58) Field of Classification Search
   CPC ........ G01S 13/931; G01S 13/89; G01S 7/415; G01S 13/52; G01S 7/411; G01S 7/417;
   (Continued)

(56) References Cited

U.S. PATENT DOCUMENTS 10,710,119 B2   7/2020   Kumar et al.
11,927,668 B2 *  3/2024   Fontijne ............... G06V 20/58
                          (Continued)

FOREIGN PATENT DOCUMENTS

DE   19720764 A1   11/1997
EP    3614302 A1    2/2020
                  (Continued)

OTHER PUBLICATIONS

Park et al., A neural network approach to target classification for active safety system using microwave radar, Expert Systems with Applications, vol. 37, Issue 3, 2010, pp. 2340-2346. (Year: 2010).*
(Continued)

*Primary Examiner* — Vladimir Magloire
*Assistant Examiner* — Anna K. Gosling
(74) *Attorney, Agent, or Firm* — Harness, Dickey & Pierce, P.L.C.

(57) ABSTRACT

This document describes techniques and systems for stationary object detection and classification based on low-level radar data. Raw electromagnetic signals reflected off stationary objects and received by a radar system may be preprocessed to produce low-level spectrum data in the form of range-Doppler maps that retain all or nearly all the data present in the raw electromagnetic signals. The preprocessing may also filter non-stationary range-Doppler bins. The remaining low-level spectrum data represents stationary objects present in a field-of-view (FOV) of the radar system. The low-level spectrum data representing stationary objects can be fed to an end-to-end deep convolutional detection and classification network that is trained to classify and provide object bounding boxes for the stationary objects. The outputted classifications and bounding boxes related to the stationary objects may be provided to other driving systems
(Continued)

to improve their functionality resulting in a safer driving experience.

19 Claims, 5 Drawing Sheets

(51) Int. Cl.
  *B60W 60/00* (2020.01)
  *G01S 13/89* (2006.01)
  *G06N 3/08* (2023.01)
(52) U.S. Cl.
  CPC ........... *G06N 3/08* (2013.01); *B60W 60/0015* (2020.02); *B60W 2420/408* (2024.01)
(58) Field of Classification Search
  CPC .............. G01S 13/93; B60W 30/0956; B60W 60/0015; B60W 2420/408; G06N 3/08
  See application file for complete search history.

(56) References Cited

U.S. PATENT DOCUMENTS

| | | | |
|---|---|---|---|
| 2018/0113195 A1* | 4/2018 | Bialer | G01S 13/86 |
| 2019/0266404 A1* | 8/2019 | Spivack | G06V 20/35 |
| 2020/0223434 A1* | 7/2020 | Campos Macias | G06V 10/141 |
| 2021/0024069 A1* | 1/2021 | Herman | B60W 30/18 |
| 2021/0081676 A1* | 3/2021 | Kim | G06V 20/47 |
| 2021/0156963 A1* | 5/2021 | Popov | G06N 3/045 |
| 2021/0293927 A1* | 9/2021 | Tyagi | G01S 7/412 |
| 2021/0346916 A1 | 11/2021 | Kumar et al. | |

FOREIGN PATENT DOCUMENTS

| | | |
|---|---|---|
| EP | 3767332 A1 | 1/2021 |
| EP | 3882654 A1 | 9/2021 |
| EP | 4024077 A1 | 7/2022 |

OTHER PUBLICATIONS

Texas Instruments, User's Guide, mmWave Demo Visualizer, Revised Apr. 2020. (Year: 2020).*
"Extended European Search Report", EP Application No. 22159819.6, Sep. 9, 2022, 16 pages.
Akita, et al., "Object Tracking and Classification Using Millimeter-Wave Radar Based on LSTM", 2019 IEEE Intelligent Transportation Systems Conference (ITSC), Oct. 2019, pp. 1110-1115.
Patel, et al., "Deep Learning-based Object Classification on Automotive Radar Spectra", 2019 IEEE Radar Conference (RadarConf), Apr. 2019, 6 pages.
Zhang, et al. "Fusion of Deep Neural Networks for Activity Recognition: A Regular Vine Copula Based Approach", Nov. 21, 2019, 7 pages.
"Extended European Search Report", EP Application No. 22207961.8, Aug. 21, 2023, 9 pages.
Shirakata, et al., "Object and Direction Classification based on Range-Doppler Map of 79 GHz MIMO Radar Using a Convolutional Neural Network", 2019 12th Global Symposium on Millimeter Waves (GSMM), May 22, 2019, 3 pages.

* cited by examiner

STATIONARY OBJECT DETECTION AND CLASSIFICATION BASED ON LOW-LEVEL RADAR DATA

BACKGROUND

Radar systems are an important component for many autonomous and semiautonomous driving applications. A major function of radar systems is to detect and classify stationary objects (e.g., stationary vehicles, debris, road signs, guard rails, etc) in a field-of-view (FOV) of one or more radar sensors integrated into a vehicle. Smaller stationary objects with small point cloud representations are particularly challenging to detect and classify, resulting in slower response times of various driving applications and decreased safety.

SUMMARY

This document describes techniques and systems for stationary object detection and classification based on low-level radar data. Raw electromagnetic signals reflected off stationary objects and received by a radar system may be preprocessed to produce low-level spectrum data in the form of range-Doppler maps that retain all or nearly all the data present in the raw electromagnetic signals. The preprocessing may also filter non-stationary range-Doppler bins. The remaining low-level spectrum data represents stationary objects present in a field-of-view (FOV) of the radar system. The low-level spectrum data representing stationary objects can be fed to an end-to-end deep convolutional detection and classification network that is trained to classify and provide object bounding boxes for the stationary objects. The outputted classifications and bounding boxes related to the stationary objects may be provided to other driving systems to improve their functionality resulting in a safer driving experience.

As an example, a method includes obtaining raw electromagnetic signals reflected off one or more objects and received by an electromagnetic sensor of a vehicle. The method further includes transforming the raw electromagnetic signals into low-level electromagnetic spectrum data to identify whether a set of objects of the one more objects are stationary objects. The method further includes responsive to identifying the set of objects as stationary objects, estimating, by a deep convolutional detection and classification network and based on the low-level electromagnetic spectrum data, a detection and classification of the stationary objects. The method further includes outputting the detection and classification of the stationary objects to a system of the vehicle for collision avoidance.

These and other described techniques may be performed by hardware or a combination of hardware and software executing thereon. For example, a computer-readable storage media (CRM) may have instructions stored thereon and that when executed configure a processor to perform the described techniques. A system may include means for performing the described techniques. A processor or processor unit may be part of a system that is configured to execute the methods and techniques described herein.

This Summary introduces simplified concepts related to stationary object detection and classification based on low-level radar data, further described in the Detailed Description and Drawings. This Summary is not intended to identify essential features of the claimed subject matter, nor is it intended for use in determining the scope of the claimed subject matter. Although primarily described in the context of vehicle radar applications, the techniques for using low-level electromagnetic spectrum data can be applied to other applications where computational efficiency for detecting and classifying objects is desired. Further, these techniques may also be applied to other embedded applications.

BRIEF DESCRIPTION OF THE DRAWINGS

The details of stationary obj ect detection and classification based on low-level radar data is described in this document with reference to the Drawings that may use same numbers to reference like features and components, and hyphenated numbers to designate variations of these like features and components. The Drawings are organized as follows.

DETAILED DESCRIPTION

Overview

Using conventional methods, larger stationary objects such as parked vehicles are generally easier to detect and classify than smaller stationary objects such as debris on a road. These conventional methods often use point cloud representations of the objects for detecting and classifying the objects. The point clouds may be produced from compressed, thresholded, or otherwise processed raw data where much of the information contained in the raw data has been removed or filtered out. Since smaller objects inherently have more sparse point clouds than larger objects, smaller objects can be more difficult to identify and classify. Low-level radar data that contains all or nearly all the information contained in the raw signals may be used to improve both small and large object detection. The low-level radar data may be in the form of range-Doppler maps, range-azimuth maps, range-elevation maps, and other forms of low-level electromagnetic spectrum data. Thresholds are not applied to the low-level radar data, and the low-level radar data applies to the entire received signal spectrum instead of focusing on the neighborhoods of peaks present in the signal spectrum. Utilizing machine learning techniques on the low-level radar data may be able to extract crucial features that are necessary for improved object detection and classification.

Compared to point cloud data or processed data cubes, low-level spectrum data are more informative and contain object information in at least three or four dimensions (e.g., range space, Doppler space, azimuth space, elevation space). The low-level spectrums can be tracked over time to produce a more robust characterization of targets of interest. Deep learning techniques have been used to classify or, separately, determine detection level information (e.g., range, azimuth level).

In contrast, the techniques and systems described herein use an end-to-end deep network to both classify and provide the detection level information with a single trained model. The object detection and classification pipeline pre-processes time-series radar data to obtain low-level radar spectrums, and a deep convolutional detection and classification network is utilized for object detection and/or classification. This trained deep convolutional detection and classification network model may be ideal for embedded applications such as autonomous or semiautonomous vehicle systems. This detection and classification of objects may be more computationally efficient, and thus, provide object data to other systems in a more timely manner than conventional techniques. The other vehicle systems may receive object data quicker, resulting in improved performance and safety.

EXAMPLE ENVIRONMENT

Figure 1:
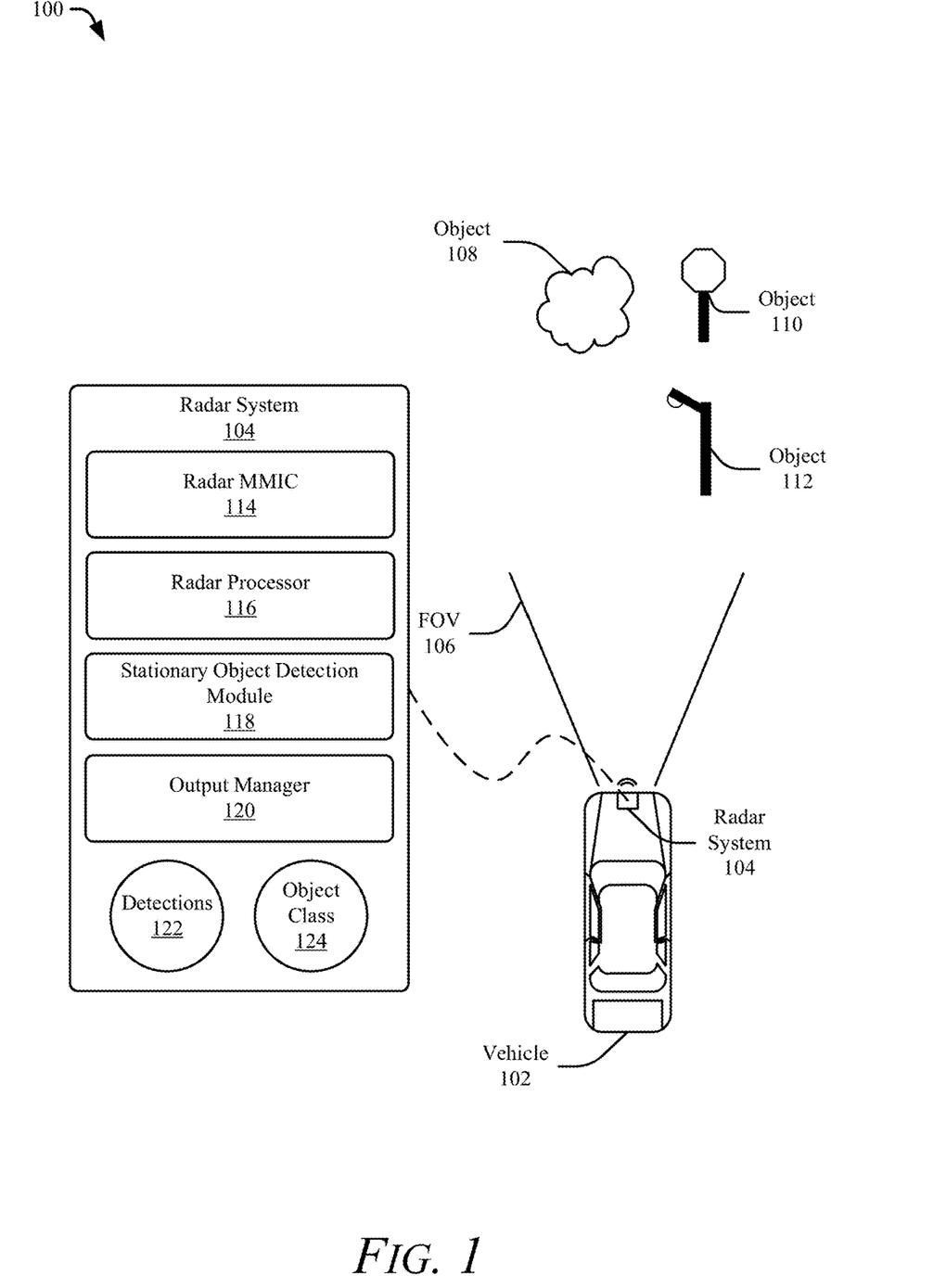
FIG. 1 illustrates an example environment in which stationary object detection and classification based on low-level radar data may be applied, in accordance with techniques of this disclosure.

FIG. 1 illustrates an example environment 100 in which stationary object detection and classification based on low-level radar data may be applied, in accordance with techniques of this disclosure.

In the depicted environment 100, a vehicle 102 travels on a roadway by at least partially relying on output from a radar system 104. Although illustrated as a passenger car, the vehicle 102 can represent other types of motorized vehicles (e.g., truck, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The radar system 104 can be installed on, mounted to, or integrated with any moving platform, including moving machinery or robotic equipment. Components of the radar system 104 can be arranged in a front, back, top, bottom, or side portion of the vehicle 102, within a bumper, integrated into a side mirror, formed as part of a headlight and/or taillight, or at any other interior or exterior location where objects require detection. The vehicle 102 may include multiple radar systems 104, such as a first radar system and a second radar system, to provide a custom field-of-view 106 that encompasses a particular region of interest outside the vehicle 102. Acting as part of a perception system of the vehicle 102, the radar system 104 aids in driving the vehicle 102 by enabling advanced safety or autonomous driving features. Vehicle subsystems may rely on the radar system 104 to detect whether any objects (e.g., objects 108, 110, and 112) appear in the environment 100 within a particular field of view (FOV) 106.

The radar system 104 is configured to detect the objects 108, 110, and 112 by radiating the objects 108, 110, and 112 within the field of view 106. For this example, the objects 108, 110, and 112 are stationary objects and includes one or more materials that reflect radar signals. The objects 108, 110, and 112 may be a parked vehicle, a traffic sign, a barrier, a pedestrian, debris, or any other stationary objects. Moving objects may also be in the FOV 106 and may be detected and classified by the described techniques of this disclosure; however, stationary objects often are more challenging to detect and classify, and this disclosure focuses on these more challenging scenarios. In the depicted environment 100, radar signals reflected off the object 108, 110, 112 may each be of a different size, and thus, each may reflect more or less energy back toward the radar system 104 than the others. After traditional radar processing, the received signal of the object reflecting less energy (e.g., smaller object), would produce a sparser point cloud than the object reflecting more energy (e.g., larger object).

The radar system 104 can include a combination of hardware components and software components executing thereon. For example, a non-transitory computer-readable storage media (CRM) of the radar system 104 may store machine-executable instructions that, when executed by a processor of the radar system 104, cause the radar system 104 to output information about objects detected in the field of view 106. As one example, the radar system 104 includes a signal processing component that may include a radar monolithic microwave integrated circuit (MMIC) 114 and a radar processor 116. The radar MIMIC 114 and the radar processor 116 may be physically separated components, or their functionality may be included within a single integrated circuit. Other processors may, likewise, be present in some aspects. In this example, the radar system 104 also includes a stationary object detection module 118 and an output manager 120. In some aspects, the stationary object detection module 118 can be stored on a CRM of another system. In other examples, the operations associated with the radar system 104 can be performed using a different arrangement or quantity of components than that shown in FIG. 1. These components receive radar signals to generate detections 122 and object class 124 for each object 108, 110, and 112. The detections 122 and object class 124 can be used to update object tracks and classify objects.

The stationary object detection module 118 can obtain electromagnetic signals reflected off the objects 108, 110, and 112 and transform the signals to generate low-level radar spectrum data that includes all or nearly all the information contained in the raw signals. The stationary object detection module can also filter the low-level radar spectrum data to identify that the objects 108, 110, and 112 are stationary objects. This transformation and identification may be performed by a trained model or by other means. The stationary object detection module can estimate, using an end-to-end deep convolutional detection and classification network to both provide detection-level data (e.g., estimated range-and-azimuth bounding boxes) and object class information about the objects 108, 110, and 112. Because detection and classification functionality are both included in the end-to-end network, the stationary object detection module 118 may be ideal for imbedded applications such as those required in automotive applications. The extensive processing required for detection and classification functionality is performed during the training of the end-to-end network and not during the inference stage resulting in computational efficiency.

EXAMPLE SYSTEMS

Figure 2:
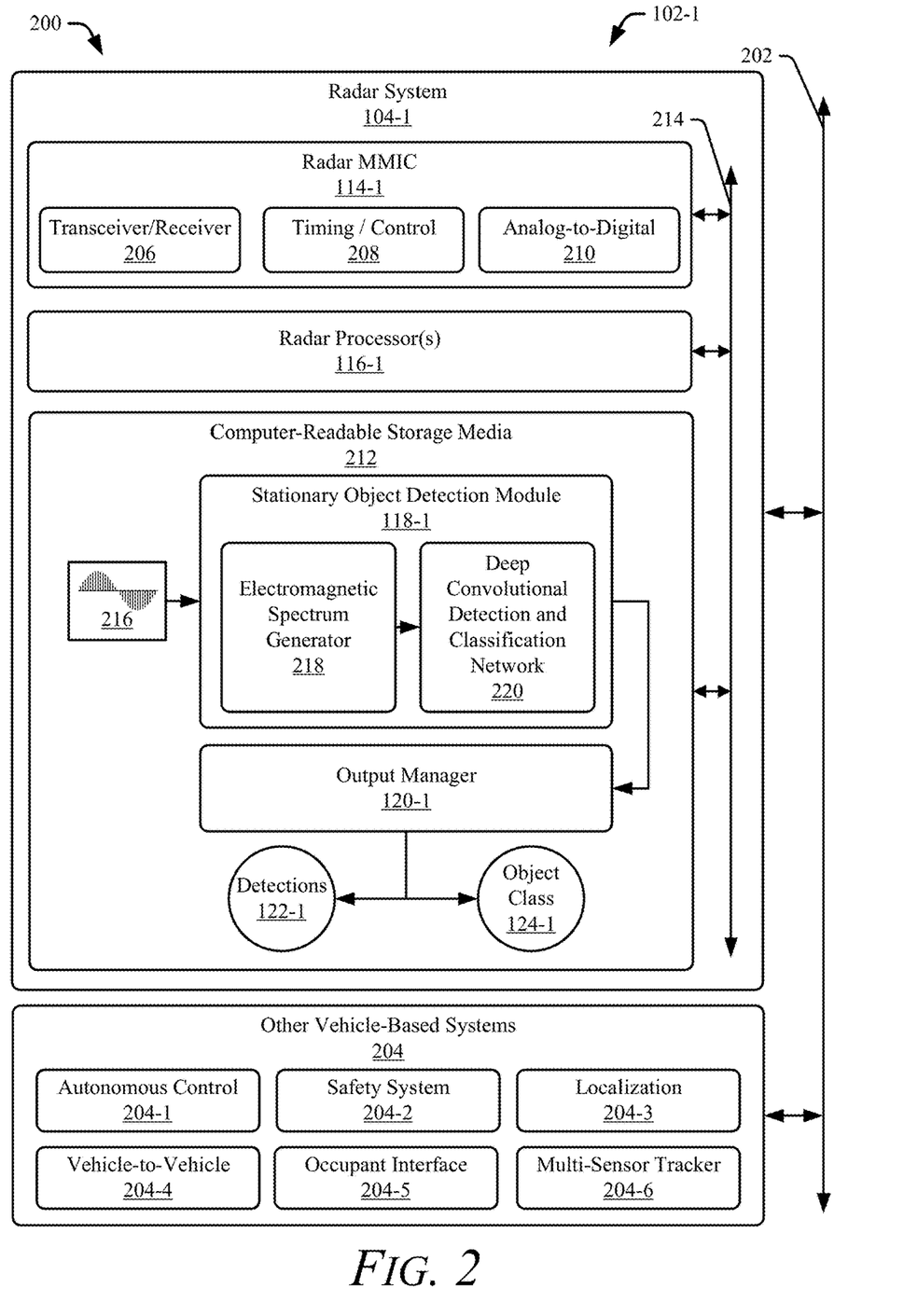
FIG. 2 illustrates an example vehicle including a system configured for stationary object detection and classification based on low-level radar data, in accordance with techniques of this disclosure.

FIG. 2 illustrates an example vehicle 102-1 including a system configured for stationary object detection and classification based on low-level radar data, in accordance with techniques of this disclosure. The vehicle 102-1 is an example of the vehicle 102. Included in the vehicle 102-1 is a radar system 104-1, which is an example of the radar system 104. The vehicle 102-1 further includes a communication link 202 that the radar system 104-1 can use to communicate to other vehicle-based systems 204. The communication link 202 may be a wired or wireless link and, in some cases, includes a communication bus (e.g., CAN bus).

The other vehicle-based systems 204 perform operations based on information received from the radar system 104-1, over the link 202, such as data output from the radar system 104-1, including information indicative of one or more objects identified and tracked in the FOV.

The radar system 104-1 includes a radar MMIC 114-1 and a radar processor 116-1, similar to the radar system 104. The radar MMIC 114-1 includes one or more transceivers/receivers 206, timing/control circuitry 208 and analog-to-digital converters (ADC) 210.

The radar system 104-1 further includes a non-transitory computer-readable storage media (CRM) 212 (e.g., a memory, long-term storage, short-term storage), which stores instructions for the radar system 104-1. The CRM 212 stores a stationary object detection module 118-1, including an electromagnetic spectrum generator 218, a deep convolutional detection and classification network 220, and an output manager 120-1. Other instructions, relevant to the operation of the radar system 104-1 may, likewise, be stored in the CRM 212. The components of the radar system 104-1 communicate via a link 214. For example, the objection detection module 118-1 receives time-series radar data 216 from the MMIC 114-1 over the link 214. The stationary object detection module 118-1 preprocesses the low-level radar data 216 via the electromagnetic spectrum generator 218. The preprocessed radar data may be in the form of a range-Doppler map or other forms of low-level radar spectrum data.

The electromagnetic spectrum generator 218 transforms the radar data 216 by using Fourier transformation to generate range-Doppler maps with beam vectors. A stationary bin identification network (e.g., a multi-layer perceptron network, a convolutional neural network), trained to identify stationary Doppler bins in the range-Doppler maps, filters the non-stationary range-Doppler bins leaving only the stationary range-Doppler bins. That is, the output of the stationary bin identification network is a binary value reflecting whether a range-Doppler bin is identified as a stationary range-Doppler bin. Since the focus is on stationary objects, the radar spectrum data can be reduced to range-azimuth maps for stationary objects. Any range bin without stationary Doppler bins can be replaced with background noise beam vectors. A super-resolution technique (e.g., discrete Fourier transforms, adaptive iteration algorithms) can be applied to the respective stationary beam vectors and background noise beam vectors, and averaging operations can be performed on the Doppler dimension to generate the range-azimuth maps. Because there is no focus on neighborhoods around peaks in the energy and no thresholding is performed, the range-azimuth maps can retain all the information contained in the raw electromagnetic signals.

The deep convolutional detection and classification network 220 receives the range-azimuth maps from the electromagnetic spectrum generator 218. A feature map based on the range-azimuth maps is generated, and the features are extracted. Regions-of-interest of the feature map are identified and pooled. From the pooled regions-of-interest, the deep convolutional detection and classification network 220 can output object class, range, and azimuth information. The deep convolutional detection and classification network 220 is described in more detail in relation to FIG. 4.

The radar processor 116-1 also receives instructions from the CRM 212 to execute the output manager 120-1 over the link 214. The output manager 120-1 distributes the outputted detections 122-1 and object class 124-1 of stationary objects (e.g., objects 108, 110, 112) to the other vehicle-based systems 204.

The other vehicle-based systems 204 can include autonomous control system 204-1, safety system 204-2, localization system 204-3, vehicle-to-vehicle system 204-4, occupant interface system 204-5, multi-sensor tracker 204-6, and other systems not illustrated. Objects in the FOV can be inferred based on the detections 122-1 and object class 124-1, and this information can be output to the other vehicle-based systems 204. In this manner, the other vehicle-based systems 204 can receive an indication of one or more objects detected by the radar system 104-1 in response to the radar system 104-1 combining and analyzing the radar data 216 generated by the received signals. The other vehicle-based systems 204 may perform a driving function or other operation that may include using output from the radar system 104-1 to assist in determining driving decisions. For example, the autonomous control system 204-1 can provide automatic cruise control and monitor the radar system 204-1 for output that indicates the presence of objects in the FOV, for instance, to slow the speed and prevent a collision with an object in the path of the vehicle 102-1. The safety system 204-2 or the occupant interface system 204-5 may provide alerts or perform a specific maneuver when the data obtained from the radar system 104-1 indicates that one or more objects are crossing in front of the vehicle 102-1. Because the stationary object detection module 118-1 may provide object information more quickly than traditional methods, the vehicle-based systems 204 may access the detections 122-1 and the object class 124-1 faster resulting in a safer and more reliable driving experience.

EXAMPLE IMPLEMENTATIONS

Figure 3:
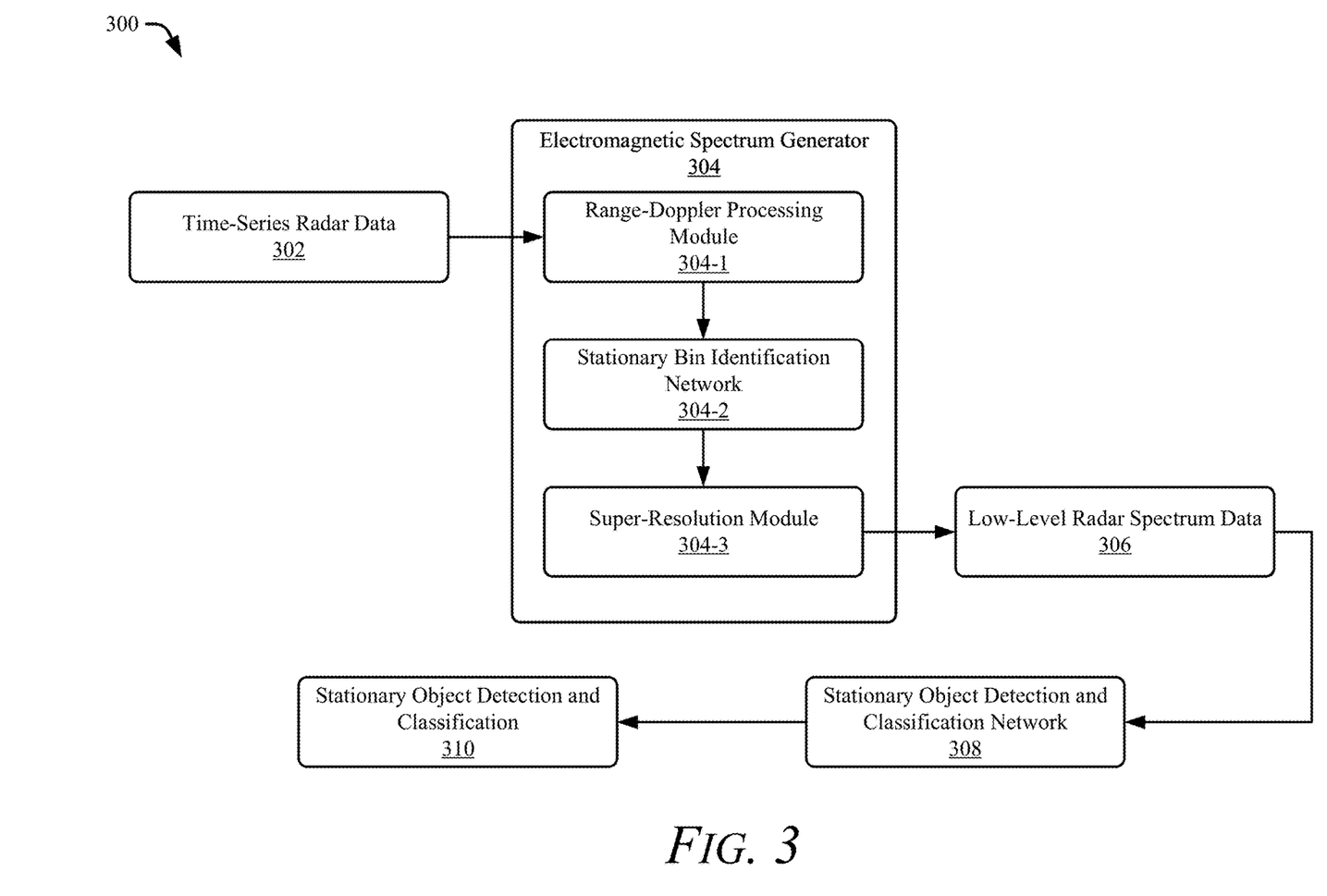
FIG. 3 illustrates an example flow of a system configured for stationary object detection and classification based on low-level radar data, in accordance with techniques of this disclosure.

FIG. 3 illustrates an example flow 300 of a system configured for stationary object detection and classification based on low-level radar data, in accordance with techniques of this disclosure. Time-series radar data 302 (e.g., the times-series radar data 216 is obtained from electromagnetic signals reflected off objects and received by a radar sensor. The time-series radar data is low-level radar data that includes all the information that is in the raw electromagnetic signals.

An electromagnetic spectrum generator 304 (e.g., the electromagnetic spectrum generator 218) receives the time-series radar data 302 and performs preprocessing steps on the time-series radar data 302. In this example, the electromagnetic spectrum generator 304 includes a range-Doppler processing module 304-1, a stationary bin identification network 304-2, and a super-resolution module 304-3.

The range-Doppler processing module 304-1 generates, based on the time-series radar data 302, range-Doppler maps with beam vectors. For example, the range-Doppler processing module 304-1 may use Fourier transforms or other methods to create the range-Doppler maps.

The stationary bin identification network 304-2 is a trained network (e.g., a multi-layer perceptron network, a convolutional neural network) that receives the range-Doppler maps and identifies stationary Doppler bins in the range-Doppler maps. The ground truth data used for training the stationary bin identification network 304-2 may be generated by using a super-resolution technique (e.g., Fourier transforms, adaptive iteration algorithms) to produce radar-azimuth spectrums (e.g., range-azimuth maps) based on beam vectors for all the Doppler bins in a range-Doppler map (or maps). Based on the range rate and azimuth angle for each range-Doppler-azimuth bin, the speed of the object is calculated and compared to the speed of a host vehicle. For example, if the speed of the object is equal to the negative speed of the host vehicle, the corresponding Doppler bin can be determined to be stationary. The cosine of the azimuth angle may be used to normalize the speed of the object to the speed of the host vehicle. That is, an object's relative speed to the host vehicle can be calculated by multiplying its associated Doppler bin by the Doppler resolution and the cosine of the azimuth angle of the object. If the object's relative speed plus the host vehicle speed is zero (e.g., object's relative speed is equal to the negative of the host vehicle speed), then the object is considered a stationary object.

The super-resolution module 304-3 receives the stationary Doppler bins from the stationary bin identification network 304-2 and performs a super-resolution technique (e.g., Fourier transforms, adaptive iteration algorithms, other super-resolution algorithms) on the stationary Doppler bins to obtain low-level radar spectrum data 306.

The low-level radar spectrum data 306 is output by the electromagnetic spectrum generator 304 and may be in the form of range-azimuth spectrum data (e.g., range-azimuth maps). The low-level radar spectrum data 306 contains all or nearly all the information contained in the related raw electromagnetic signals. Because the focus is on stationary objects, non-stationary objects have been removed by filtering and the Doppler space has been collapsed by the electromagnetic spectrum generator 304.

The deep convolutional detection and classification network 308 (e.g., the deep convolutional detection and classification network 220) receives the low-level radar spectrum data 306. The deep convolutional detection and classification network 308 performs the functions of estimating the class and detection of stationary objects. The deep convolutional detection and classification network 308 may use convolution to generate a feature map based on the low-level radar spectrum data 306. Region proposals (e.g., candidate boxes of the feature map) are produced with respect to anchor points on the feature map. The proposed regions that have a likelihood to include an object are pooled into regions-of-interest, and the regions-of-interest are further processed (e.g., by a classifier and a regressor) to produce stationary object detection and classification information 310. The detection information may be in the form of a range and azimuth bounding box or in other forms.

Figure 4:
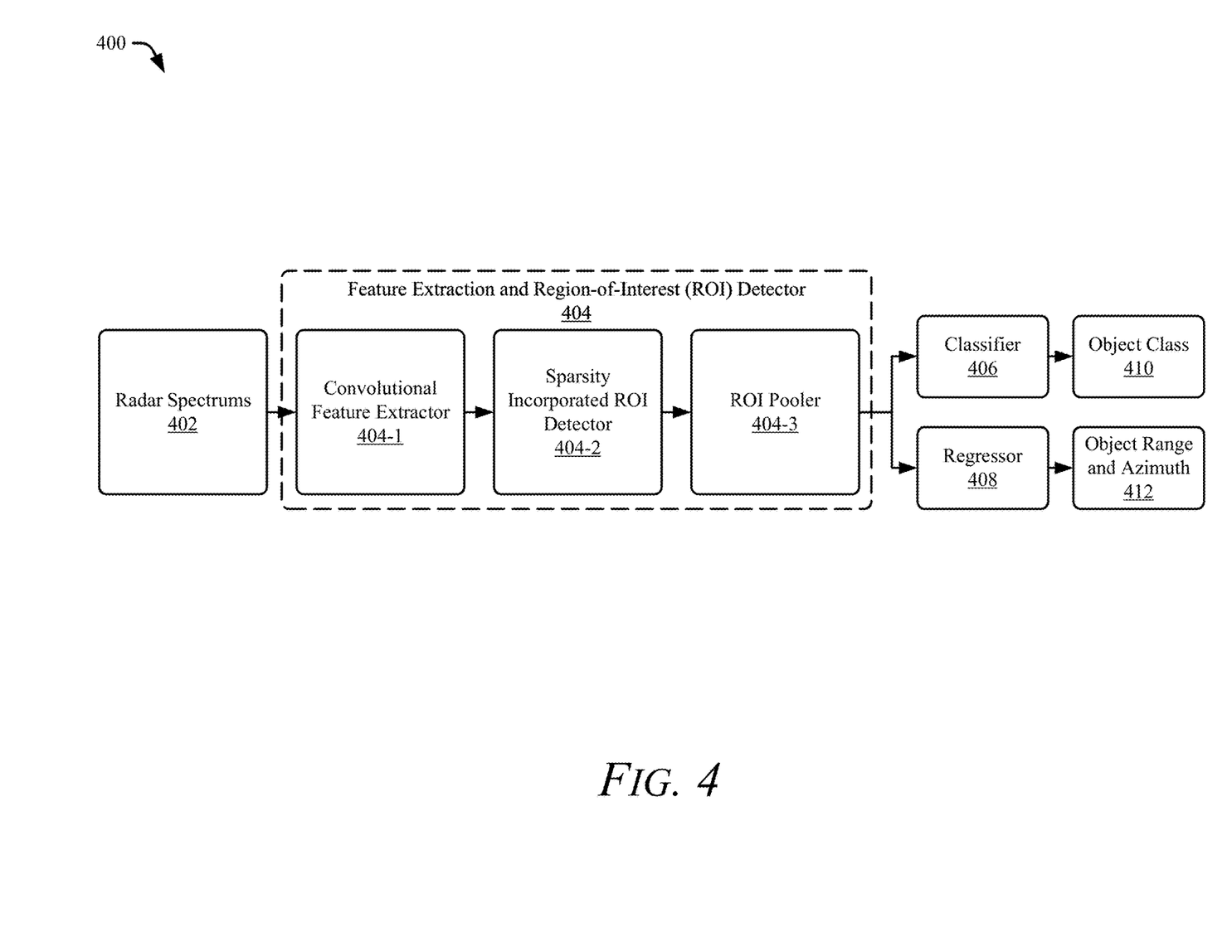
FIG. 4 illustrates an example deep convolutional detection and classification network 400 of a system configured for stationary object detection and classification based on low-level radar data, in accordance with techniques of this disclosure.

FIG. 4 illustrates an example deep convolutional detection and classification network 400 of a system configured for stationary object detection and classification based on low-level radar data, in accordance with techniques of this disclosure. Radar spectrums 402 are input into the deep convolutional detection and classification network 400. These radar spectrums may be in the form of range-azimuth maps and contain information related to stationary objects.

The deep convolutional detection and classification network 400 has two stages. The first stage includes a feature extraction and region-of-interest detector 404. The feature extraction and region-of-interest detector 404 includes a convolutional feature extractor 404-1, a sparsity incorporated region-of-interest detector 404-2, and a region-of-interest pooler 404-3.

The convolutional feature extractor 404-1 receives the radar spectrums 402 as input data and outputs a feature map. The feature map is input into the sparsity incorporated region-of-interest detector 404-2. The sparsity incorporated region-of-interest detector 404-2 generates region proposals (e.g., candidate bounding boxes, proposal boxes) for anchor points of the feature map that may have objects to detect. For each region proposal, a classifier determines the probability of the proposal box having the target object and a regressor estimates the corresponding coordinates of the box. The region proposals are generated using two parameters. The first parameter is scale value referring to the size of the proposal box, and the second parameter is an aspect ratio value. The aspect ratio is the ratio between the width and height of the box. For example, three scale values and three aspect ratio values may be selected resulting in nine region proposals for each anchor point.

Classification and regression are performed on each proposal box to determine if a box has a target and to estimate the box coordinates of the target. Proposal boxes may be generated for each anchor point in the feature map using a constant stride. Since the radar spectrum image is a sparse image, the feature map can be expected to be sparse. Using $x \in \mathcal{R}^{W \times H}$ to denote the feature map, a binary filter matrix $s \in \mathcal{R}^{W \times H}$ can be formed where only proposal boxes for $s_{i,j}=1, i=1, \ldots, W, j=1, \ldots, H$ are generated. The sparsity of the filter matrix can be learned from network training. The loss function of the sparsity incorporated region-of-interest detector 404-2 is given as $$\mathcal{L} = \frac{1}{N_{cls}} \sum_i \mathcal{L}_{cls}(p_i, p_i^*) + \frac{\lambda_1}{N_{reg}} \sum_i p_i^* \cdot L_1^{smooth}(t_i - t_i^*) + \lambda_2 * \|s\|_1$$

where $p_i$ is the probability of anchor i being an object or not, $t_i$ is a vector of 4 coordinates of predicted bounding box, * represents the ground truth box (e.g., ground truth coordinates). $\mathcal{L}_{cls}$ is log loss function over two classes (is an object or not), defined as $\mathcal{L}_{cls}(p_i, p_i^*)=-p_i^* \log p_i-(1-p_i^*)\log(1-p_i)$, and $L_1^{smooth}(x)$ is defined as $$\begin{cases} |x| & \text{if } |x| > 1 \\ x^2 & \text{if } |x| \le 1 \end{cases} \cdot \|s\|_1$$

is the $\mathcal{L}_1$ norm which captures the sparsity of the filter matrix $s\gamma_1$ and $\gamma_2$ are regularization parameters. That is, the binary filter matrix includes binary values that indicate a likelihood that a respective region proposal includes an object.

Sparsity is incorporated on the feature map to reduce the number of region proposals. However, the number of region proposals may still be significantly large. To further reduce the number of region proposals, non-maximum suppression may be used to select the most relevant region proposals to generate regions-of-interest. The regions-of-interest are pooled by the region-of-interest pooler 404-3 to be output to the second stage of the deep convolutional detection and classification network 400.

The second stage estimates object classification, range, and azimuth, and includes a classifier 406 and a regressor 408. The classifier 406 may be a fully connected network trained for object classification and include focal loss when computing class. The classifier 406 outputs an object class 410.

The regressor 408 estimates range and azimuth using regression techniques. The regressor 408 may, likewise to the classifier 406, be a fully connected network. Smooth $\mathcal{L}_1$ loss is used during the regression calculations of the regressor 408. The regressor 408 outputs a range and azimuth for an object. The output of the regressor may be in the form of an estimated range and azimuth bounding box.

The deep convolutional detection and classification network 308 incorporates both the functions of determining object class and estimating range-azimuth for stationary objects into one end-to-end deep neural network, which may be ideal for embedded systems. The deep convolutional detection and classification network 308 may increase the data throughput of radar data enabling other systems quicker access to that data and resulting in a safer and more reliable driving experience.

EXAMPLE METHODS

Figure 5:
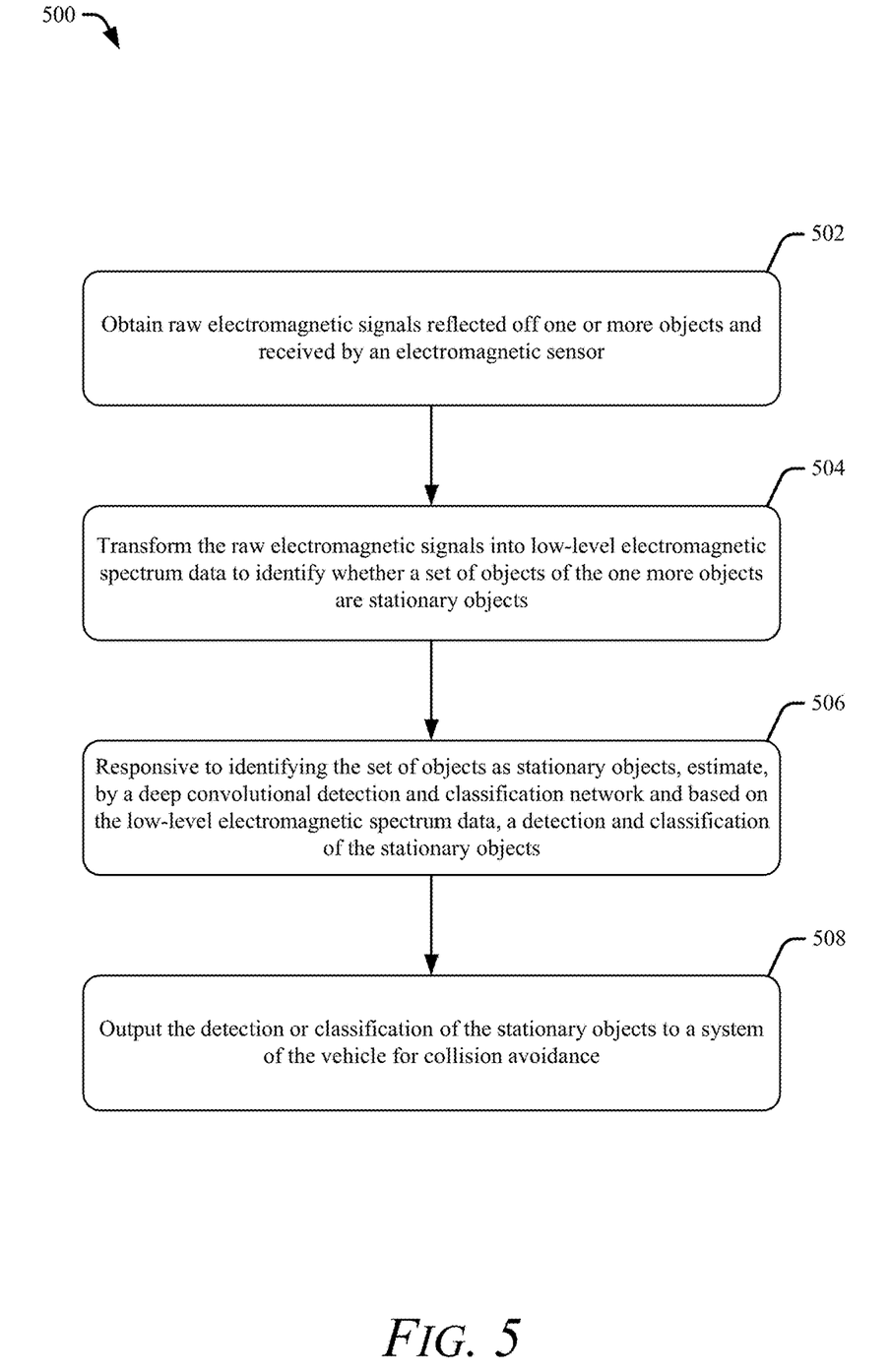
FIG. 5 illustrates an example method for stationary object detection and classification based on low-level radar data, in accordance with techniques of this disclosure.

FIG. 5 illustrates an example method 500 for stationary object detection and classification based on low-level radar data, in accordance with techniques of this disclosure. Method 500 is shown as sets of operations (or acts) performed, but not necessarily limited to the order or combinations in which the operations are shown herein. Further, any of one or more of the operations may be repeated, combined, or reorganized to provide other methods.

At step 502, raw electromagnetic signals reflected off one or more objects and received by an electromagnetic sensor are obtained. For example, a radar system integrated into a vehicle can transmit electromagnetic radiation and receive the reflections of the radiation off objects in an FOV of the radar sensor as signals that contain information about the associated objects. This information can include range, range rate, azimuth angle, and/or elevation angle.

At step 504, the raw electromagnetic signals into low-level electromagnetic spectrum data to identify whether a set of objects of the one more objects are stationary objects are transformed. This transformation is a preprocessing step. For example, range-Doppler maps can be generated based on the low-level electromagnetic spectrum data. Each range-Doppler bin in the map has an associated beam vector. From these range-Doppler maps, stationary range-Doppler bins can be identified. The non-stationary range-Doppler bins can be filtered out, retaining the stationary range-Doppler bins. The filtered non-stationary range-Doppler bins may be filled in with background noise beam vectors or data derived from background noise beam vectors. A super-resolution technique can be applied to the respective beam vectors associated with the stationary range-Doppler bins and the background noise beam vectors to obtain azimuth information for each respective bin. Range-azimuth maps can be generated based on the stationary range-Doppler bins by performing an averaging function across the Doppler dimension and then collapsing the Doppler space.

The stationary range-Doppler bins may be identified by a trained network (e.g., the stationary bin identification network 304-2). Ground truth data for training the trained model can be generated by using a super-resolution technique (e.g., Fourier transforms, adaptive iteration approaches) to produce azimuth information (e.g., azimuth angle), based on the beam vectors for all the associated range-Doppler bins. Based on the azimuth information for each range-Doppler bin, the corresponding speed for each bin is calculated. The calculated speed associated with each bin can be compared to a host vehicle speed to identify the range-Doppler bins representing stationary objects. The ground truth data is based on these stationary range-Doppler bins.

At step 506, responsive to identifying the set of objects as stationary objects, a detection and classification of the stationary objects are estimated. A deep convolutional detection and classification network can receive as input the low-level electromagnetic spectrum data (e.g., range-azimuth spectrum data, range-azimuth maps) and output the estimated detection and classification information of the stationary objects. The detection information can be in the form of a range-azimuth bounding box.

The deep convolutional detection and classification network is an end-to-end network with two stages. In the first stage, a feature map is produced from the range-azimuth data. Region proposals, or candidate boxes, associated with anchor points on the feature map can be generated, and regions-of-interest can be calculated based on these region proposals. The regions-of-interest can be pooled for the second stage.

In the second stage, class is determined using a fully connected network and focal loss. The detection information (e.g., range and azimuth angle) can be estimated using a regression-based fully connected network and smooth $\mathcal{L}_1$ loss, as previously described.

At step 508, the detection and classification of the stationary objects are output. Using the same example presented in step 502, the detection and classification data can be output to other systems of the vehicle. These other systems can use the detection and classification data to avoid collisions with the objects. Because the techniques and systems described herein utilize an end-to-end deep neural network that is conducive to embedded applications, improved throughput may be achieved for the radar data to the end systems resulting in safer and more reliable decisions to be made by the end systems.

ADDITIONAL EXAMPLES

Some additional examples for stationary object detection and classification based on low-level radar data are provided below.

Example 1: A method comprising: obtaining raw electromagnetic signals reflected off one or more objects and received by an electromagnetic sensor of a vehicle; transforming the raw electromagnetic signals into low-level electromagnetic spectrum data to identify whether a set of objects of the one more objects are stationary objects; responsive to identifying the set of obj ects as stationary obj ects, estimating, by a deep convolutional detection and classification network and based on the low-level electromagnetic spectrum data, a detection and classification of the stationary obj ects; and outputting the detection or classification of the stationary objects to a system of the vehicle for collision avoidance.

Example 2: The method of example 1, wherein transforming the raw electromagnetic signals into the low-level electromagnetic spectrum data comprises: generating, based on the raw electromagnetic signals, a range-Doppler map wherein each range-Doppler bin of the range-Doppler map has an associated beam vector; determining, based on the range-Doppler map, stationary range-Doppler bins; and generating, based on the stationary range-Doppler bins, range-azimuth maps.

Example 3: The method of any one of the preceding examples, wherein: determining the stationary range-Doppler bins comprises: identifying, by a trained network, the stationary range-Doppler bins; filtering, by the trained network, the non-stationary range-Doppler bins; and outputting, by the trained network, the stationary range-Doppler bins; and the trained network is trained by: producing, based on beam vectors for all the range-Doppler bins of the range-Doppler map, an azimuth angle associated with each range-Doppler bin by: calculating Fourier transforms on the range-Doppler bins; or using a super-resolution algorithm on the range-Doppler bins; comparing, based on a range rate and the azimuth angle associated with each range-Doppler bin, a speed associated with each range-Doppler bin with a speed of the vehicle; identifying, based on the comparing, whether each range-Doppler bin is a stationary range-Doppler bin; and responsive to identifying that any range-Doppler bins are stationary range-Doppler bins, using the stationary range-Doppler bins as ground truth data for training the trained network.

Example 4: The method of any one of the preceding examples, wherein determining the stationary range-Doppler bins comprises: filtering the range-Doppler map to remove non-stationary range-Doppler bins.

Example 5: The method of any one of the preceding examples, wherein generating the range-azimuth maps comprises replacing non-stationary range-Doppler bins with data derived from background noise beam vectors; performing a super-resolution algorithm on the respective beam vectors of each stationary range-Doppler bin and the background noise beam vectors; and performing an averaging operation on a Doppler dimension of the stationary range-Doppler bins.

Example 6: The method of any one of the preceding examples, wherein estimating the detection and the classification of the stationary objects comprises: inputting, to the deep convolutional detection and classification network, the range-azimuth maps; and outputting, from the deep convolutional detection and classification network and for each stationary object represented in the range-azimuth maps, an estimated range-and-azimuth bounding box and an object class.

Example 7: The method of any one of the preceding examples, the method further comprising: in a first stage of the deep convolutional detection and classification network: generating, based on the range-azimuth maps and by a convolutional feature extractor, a feature map; producing, based on the feature map, region proposals, the region proposals being candidate bounding boxes for the stationary objects; and determining, based on the region proposals, object regions-of-interest; and in a second stage of the deep convolutional detection and classification network: estimating, based on the object regions-of-interest, the object class of each stationary object; and estimating, based on the object regions-of-interest and regression, coordinates of the range-and-azimuth bounding box for each stationary object.

Example 8: The method of any one of the preceding examples, wherein producing the region proposals comprises: electing one or more scale values; and selecting one or more aspect ratio values.

Example 9: The method of any one of the preceding examples, wherein: at least three scale values are selected; and at least three aspect ratio values are selected.

Example 10: The method of any one of the preceding examples, wherein determining the object regions-of-interest comprises: applying each region proposal to one or more anchor points of the feature map, each region proposal including one of the one or more scale values and one of the one or more aspect ratio values; determining a probability that a respective region proposal includes an object; generating, based on the probability, a binary filter matrix including a binary value that indicates a likelihood the respective region proposal includes an object, wherein the binary values are based on a loss function comparing coordinates of each region proposal to ground truth coordinates.

Example 11: The method of any one of the preceding examples, the method further comprising: using non-maximum suppression to further reduce a number of region proposals with a likelihood to include an object.

Example 12: The method of any one of the preceding examples, wherein the trained network comprises a multi-layer perceptron network.

Example 13: The method of any one of the preceding examples, wherein the trained network comprises a convolutional neural network.

Example 14: A system comprising: one or more processors configured to: obtain raw electromagnetic signals reflected off one or more objects and received by an electromagnetic sensor of a vehicle; transform the raw electromagnetic signals into low-level electromagnetic spectrum data to identify whether a set of objects of the one more objects are stationary objects; responsive to identifying the set of objects as stationary objects, estimate, by a deep convolutional detection and classification network and based on the low-level electromagnetic spectrum data, a detection and classification of the stationary objects; and output the detection or classification of the stationary objects to a system of the vehicle for collision avoidance.

Example 15: The system of any one of the preceding examples, wherein the one or more processors are configured to transform the raw electromagnetic signals into low-level electromagnetic spectrum data by at least: generating, based on the raw electromagnetic signals, a range-Doppler map wherein each range-Doppler bin of the range-Doppler map has an associated beam vector; determining, based on the range-Doppler map, stationary range-Doppler bins; and generating, based on the stationary range-Doppler bins, range-azimuth maps.

Example 16: The system of any one of the preceding examples, wherein the one or more processors are configured to determine the stationary range-Doppler bins by at least: filtering the range-Doppler map to remove non-stationary range-Doppler bins.

Example 17: The system of any one of the preceding examples, wherein the one or more processors are configured to estimate the detection and classification of the stationary objects by executing: a first stage of the deep convolutional detection and classification network that comprises: generating, based on the range-azimuth maps and by a convolutional feature extractor, a feature map; producing, based on the feature map, region proposals, the region proposals being candidate bounding boxes for the stationary objects; and determining, based on the region proposals, object regions-of-interest; and a second stage of the deep convolutional detection and classification network that comprises: estimating, based on the object regions-of-interest, the object class of each stationary object; and estimating, based on the object regions-of-interest and regression, coordinates of a range-and-azimuth bounding box for each stationary object.

Example 18: The system of any one of the preceding examples, wherein the one or more processors are configured to determine the object regions-of-interest by at least: applying each region proposal to one or more anchor points of the feature map, each region proposal including a scale value and an aspect ratio value; determining a probability that a respective region proposal includes an object; generating, based on the probability, a binary filter matrix including a binary value that indicates a likelihood the respective region proposal includes an obj ect, wherein the binary values are based on a loss function comparing coordinates of each region proposal to ground truth coordinates.

Example 19: The system of any one of the preceding examples, wherein the one or more processors are further configured to determine the object regions-of-interest by:

using non-maximum suppression to further reduce a number of region proposals with a likelihood to include an object.

Example 20: A computer-readable storage media comprising instructions that, when executed, configure a processor to: obtain raw electromagnetic signals reflected off one or more objects and received by an electromagnetic sensor of a vehicle; transform the raw electromagnetic signals into low-level electromagnetic spectrum data to identify whether a set of objects of the one more objects are stationary objects; responsive to identifying the set of objects as stationary objects, estimate, by a deep convolutional detection and classification network and based on the low-level electromagnetic spectrum data, a detection and classification of the stationary objects; and output the detection or classification of the stationary objects to a system of the vehicle for collision avoidance.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
obtaining raw electromagnetic signals reflected off one or more objects and received by an electromagnetic sensor of a vehicle;
transforming the raw electromagnetic signals into low-level electromagnetic spectrum data to identify whether a set of objects of the one more objects are stationary objects;
responsive to identifying the set of objects as stationary objects, estimating, by a deep convolutional detection and classification network and based on the low-level electromagnetic spectrum data, a detection and classification of the stationary objects; and
outputting the detection or classification of the stationary objects to a system of the vehicle for collision avoidance,
wherein transforming the raw electromagnetic signals into the low-level electromagnetic spectrum data comprises:
generating, based on the raw electromagnetic signals, a range-Doppler map wherein each range-Doppler bin of the range-Doppler map has an associated beam vector:
determining, based on the range-Doppler map, stationary range-Doppler bins; and
generating, based on the stationary range-Doppler bins, range-azimuth maps;
wherein generating the range-azimuth maps comprises:
replacing non-stationary range-Doppler bins with data derived from background noise beam vectors;
performing a super-resolution algorithm on the respective beam vectors of each stationary range-Doppler bin and the background noise beam vectors; and
performing an averaging operation on a Doppler dimension of the stationary range-Doppler bins.

2. The method of claim 1, wherein:
determining the stationary range-Doppler bins comprises:
identifying, by a trained network, the stationary range-Doppler bins;
filtering, by the trained network, non-stationary range-Doppler bins; and
outputting, by the trained network, the stationary range-Doppler bins; and
the trained network is trained by:
producing, based on beam vectors for all the range-Doppler bins of the range-Doppler map, an azimuth angle associated with each range-Doppler bin by:
calculating Fourier transforms on the range-Doppler bins; or
using a super-resolution algorithm on the range-Doppler bins;
comparing, based on a range rate and the azimuth angle associated with each range-Doppler bin, a speed associated with each range-Doppler bin with a speed of the vehicle;
identifying, based on the comparing, whether each range-Doppler bin is a stationary range-Doppler bin; and
responsive to identifying that any range-Doppler bins are stationary range-Doppler bins, using the stationary range-Doppler bins as ground truth data for training the trained network.

3. The method of claim 1, wherein determining the stationary range-Doppler bins comprises:
filtering the range-Doppler map to remove non-stationary range-Doppler bins.

4. The method of claim 1, wherein estimating the detection and the classification of the stationary objects comprises:
inputting, to the deep convolutional detection and classification network, the range-azimuth maps; and
outputting, from the deep convolutional detection and classification network and for each stationary object represented in the range-azimuth maps, an estimated range-and-azimuth bounding box and an object class.

5. The method of claim 4, the method further comprising:
in a first stage of the deep convolutional detection and classification network:
generating, based on the range-azimuth maps and by a convolutional feature extractor, a feature map;
producing, based on the feature map, region proposals, the region proposals being candidate bounding boxes for the stationary objects; and
determining, based on the region proposals, object regions-of-interest; and
in a second stage of the deep convolutional detection and classification network:
estimating, based on the object regions-of-interest, the object class of each stationary object; and
estimating, based on the object regions-of-interest and regression, coordinates of the range-and-azimuth bounding box for each stationary object.

6. The method of claim 5, wherein producing the region proposals comprises:
selecting one or more scale values; and
selecting one or more aspect ratio values.

7. The method of claim 6, wherein:
at least three scale values are selected; and
at least three aspect ratio values are selected.

8. The method of claim 6, wherein determining the object regions-of-interest comprises:
applying each region proposal to one or more anchor points of the feature map, each region proposal including one of the one or more scale values and one of the one or more aspect ratio values;
determining a probability that a respective region proposal includes an object; and
generating, based on the probability, a binary filter matrix including a binary value that indicates a likelihood the respective region proposal includes an object, wherein the binary values are based on a loss function comparing coordinates of each region proposal to ground truth coordinates.

9. The method of claim 8, the method further comprising:
using non-maximum suppression to further reduce a number of region proposals with a likelihood to include an object.

10. The method of claim 2, wherein the trained network comprises a multi-layer perceptron network.

11. The method of claim 2, wherein the trained network comprises a convolutional neural network.

12. A system comprising:
one or more processors configured to:
obtain raw electromagnetic signals reflected off one or more objects and received by an electromagnetic sensor of a vehicle;
transform the raw electromagnetic signals into low-level electromagnetic spectrum data to identify whether a set of objects of the one more objects are stationary objects;
responsive to identifying the set of objects as stationary objects, estimate, by a deep convolutional detection and classification network and based on the low-level electromagnetic spectrum data, a detection and classification of the stationary objects; and
output the detection or classification of the stationary objects to a system of the vehicle for collision avoidance,
wherein transforming the raw electromagnetic signals into the low-level electromagnetic spectrum data comprises:
generating, based on the raw electromagnetic signals, a range-Doppler map wherein each range-Doppler bin of the range-Doppler map has an associated beam vector;
determining, based on the range-Doppler map, stationary range-Doppler bins; and
generating, based on the stationary range-Doppler bins, range-azimuth maps;
wherein generating the range-azimuth maps comprises:
replacing non-stationary range-Doppler bins with data derived from background noise beam vectors;
performing a super-resolution algorithm on the respective beam vectors of each stationary range-Doppler bin and the background noise beam vectors; and
performing an averaging operation on a Doppler dimension of the stationary range-Doppler bins.

13. The system of claim 12, wherein the one or more processors are configured to determine the stationary range-Doppler bins by at least:
filtering the range-Doppler map to remove non-stationary range-Doppler bins.

14. The system of claim 12, wherein the one or more processors are configured to estimate the detection and classification of the stationary objects by executing:
a first stage of the deep convolutional detection and classification network that comprises:
generating, based on the range-azimuth maps and by a convolutional feature extractor, a feature map;
producing, based on the feature map, region proposals, the region proposals being candidate bounding boxes for the stationary objects; and
determining, based on the region proposals, object regions-of-interest; and
a second stage of the deep convolutional detection and classification network that comprises:
estimating, based on the object regions-of-interest, the object classification of each stationary object; and
estimating, based on the object regions-of-interest and regression, coordinates of a range-and-azimuth bounding box for each stationary object.

15. The system of claim 14, wherein the one or more processors are configured to determine the object regions-of-interest by at least:
applying each region proposal to one or more anchor points of the feature map, each region proposal including a scale value and an aspect ratio value;
determining a probability that a respective region proposal includes an object; and
generating, based on the probability, a binary filter matrix including a binary value that indicates a likelihood the respective region proposal includes an object, wherein the binary values are based on a loss function comparing coordinates of each region proposal to ground truth coordinates.

16. The system of claim 15, wherein the one or more processors are further configured to determine the object regions-of-interest by:
using non-maximum suppression to further reduce a number of region proposals with a likelihood to include an object.

17. A non-transitory computer-readable storage media comprising instructions that, when executed, configure a processor to:
obtain raw electromagnetic signals reflected off one or more objects and received by an electromagnetic sensor of a vehicle;
transform the raw electromagnetic signals into low-level electromagnetic spectrum data to identify whether a set of objects of the one more objects are stationary objects;
responsive to identifying the set of objects as stationary objects, estimate, by a deep convolutional detection and classification network and based on the low-level electromagnetic spectrum data, a detection and classification of the stationary objects; and
output the detection or classification of the stationary objects to a system of the vehicle for collision avoidance,
wherein transforming the raw electromagnetic signals into the low-level electromagnetic spectrum data comprises:
generating, based on the raw electromagnetic signals, a range-Doppler map wherein each range-Doppler bin of the range-Doppler map has an associated beam vector;
determining, based on the range-Doppler map, stationary range-Doppler bins; and
generating, based on the stationary range-Doppler bins, range-azimuth maps;

wherein generating the range-azimuth maps comprises:
replacing non-stationary range-Doppler bins with data derived from background noise beam vectors;
performing a super-resolution algorithm on the respective beam vectors of each stationary range-Doppler bin and the background noise beam vectors; and
performing an averaging operation on a Doppler dimension of the stationary range-Doppler bins.

18. A method comprising:
obtaining raw electromagnetic signals reflected off one or more objects and received by an electromagnetic sensor of a vehicle;
transforming the raw electromagnetic signals into low-level electromagnetic spectrum data to identify whether a set of objects of the one more objects are stationary objects;
responsive to identifying the set of objects as stationary objects, estimating, by a deep convolutional detection and classification network and based on the low-level electromagnetic spectrum data, a detection and classification of the stationary objects; and
outputting the detection or classification of the stationary objects to a system of the vehicle for collision avoidance,
wherein transforming the raw electromagnetic signals into the low-level electromagnetic spectrum data comprises:
generating, based on the raw electromagnetic signals, a range-Doppler map wherein each range-Doppler bin of the range-Doppler map has an associated beam vector;
determining, based on the range-Doppler map, stationary range-Doppler bins; and
generating, based on the stationary range-Doppler bins, range-azimuth maps;
wherein estimating the detection and the classification of the stationary objects comprises:
inputting, to the deep convolutional detection and classification network, the range-azimuth maps; and
outputting, from the deep convolutional detection and classification network and for each stationary object represented in the range-azimuth maps, an estimated range-and-azimuth bounding box and an object class;
in a first stage of the deep convolutional detection and classification network:
generating, based on the range-azimuth maps and by a convolutional feature extractor, a feature map;
producing, based on the feature map, region proposals, the region proposals being candidate bounding boxes for the stationary objects; and
determining, based on the region proposals, object regions-of-interest; and
in a second stage of the deep convolutional detection and classification network:
estimating, based on the object regions-of-interest, the object class of each stationary object; and
estimating, based on the object regions-of-interest and regression, coordinates of the range-and-azimuth bounding box for each stationary object.

19. A system comprising:
one or more processors configured to:
obtain raw electromagnetic signals reflected off one or more objects and received by an electromagnetic sensor of a vehicle;
transform the raw electromagnetic signals into low-level electromagnetic spectrum data to identify whether a set of objects of the one more objects are stationary objects;
responsive to identifying the set of objects as stationary objects, estimate, by a deep convolutional detection and classification network and based on the low-level electromagnetic spectrum data, a detection and classification of the stationary objects;
and output the detection or classification of the stationary objects to a system of the vehicle for collision avoidance,
wherein transforming the raw electromagnetic signals into the low-level electromagnetic spectrum data comprises:
generating, based on the raw electromagnetic signals, a range-Doppler map wherein each range-Doppler bin of the range-Doppler map has an associated beam vector;
determining, based on the range-Doppler map, stationary range-Doppler bins; and
generating, based on the stationary range-Doppler bins, range-azimuth maps;
wherein the one or more processors are configured to estimate the detection and classification of the stationary objects by executing:
a first stage of the deep convolutional detection and classification network that comprises:
generating, based on the range-azimuth maps and by a convolutional feature extractor, a feature map;
producing, based on the feature map, region proposals, the region proposals being candidate bounding boxes for the stationary objects; and
determining, based on the region proposals, object regions-of-interest; and
a second stage of the deep convolutional detection and classification network that comprises:
estimating, based on the object regions-of-interest, the object classification of each stationary object; and
estimating, based on the object regions-of-interest and regression, coordinates of a range-and-azimuth bounding box for each stationary object.

* * * * *